Patented Nov. 28, 1950

2,531,406

UNITED STATES PATENT OFFICE 2,531,406

N,N-DIMETHYL ACETAMIDE-CONTAINING COMPOSITIONS

Gaetano F. D'Alelio, Shaker Heights, Ohio, assignor to Industrial Rayon Corporation, Cleveland, Ohio, a corporation of Delaware No Drawing. Application October 25, 1946, Serial No. 705,803

7 Claims. (Cl. 260—32.6)

This invention relates to the preparation of compositions of polymeric materials and to the production of shaped articles therefrom. More specifically, the invention provides new and useful compositions of vinylidene chloride polymers, and shaped articles formed therefrom. Moreover, it provides a method for preparing such shaped articles. The term "polymers" is intended herein to include copolymers.

Very useful polymers have been prepared from vinylidene chloride with or without other polymerizable substances, for example, vinyl, vinylidene and other mono-ethylenic compounds, and conjugated diene compounds, such as butadiene, etc., in which polymers at least 50% by weight is vinylidene chloride. These vinylidene chloride polymers possess desirable physical and chemical properties including toughness and solvent resistance to common organic solvents such as methyl or ethyl alcohol, acetone, ethyl ether, ethyl acetate, hydrocarbon solvents, chlorinated hydrocarbons and the like. Because of these properties, it has been considered desirable to fashion these polymeric materials into fibers, films and other shaped articles.

In accordance with the present invention it has been found that new compositions useful for the production of shaped articles such as, for example, filaments, films and the like, may be prepared by treating vinylidene chloride polymers with N,N-dimethyl acetamide. In addition the polymerization of the vinylidene chloride, either alone or in the presence of other polymerizable materials, may be accomplished in the presence of N,N-dimethyl acetamide.

Heretofore it has been proposed to use tetrachloroethylene, orthodichlorobenzene and cyclohexanone in the preparation of workable compositions containing vinylidene chloride polymers. However, cyclohexanone and orthodichlorobenzene are capable of forming only very dilute solutions of polyvinylidene chloride even at their boiling points. Likewise the concentration of polyvinylidene chloride in a very active solvent such as tetrachloroethylene at its boiling point is less than 4 percent.

In accordance with the present invention it has been found that new compositions useful for the production of shaped articles such as, for example, filaments, films and the like, may be prepared by treating vinylidene chloride polymers with N,N-dimethyl acetamide. By employing the methods of this invention new fibers, films and the like having particularly desirable properties may be readily produced. In addition, the polymerization of the vinylidene chloride, either alone or in the presence of other polymerizable substances, may be accomplished in the presence of N,N-dimethyl acetamide.

It has been found that the compositions of this invention may be produced by dissolving vinylidene chloride polymers, in which 50 percent or more by weight of the polymer molecule is vinylidene chloride, in N,N-dimethyl acetamide. N,N-Dimethyl acetamide is commonly made by the reaction of acetic acid with dimethyl amine and the boiling point of this product is given as 165–175° C. (Mitchell & Reid: J. Am. Chem. Soc. 53, 1879 (1931)). Acetic acid is generally found as part of an azeotropic mixture in N,N-dimethyl acetamide obtained by this common method of preparation. When N,N-dimethyl acetamide is completely acetic acid-free, its boiling point drops from 165–175° C. (J. Am. Chem. Soc., 53, 1879 1931)) to 165.8–164.9° C./759 mm. (J. Am. Chem. Soc., 59, 401 (1937)). N,N-dimethyl acetamide may be purified by adding an acid binding agent, such as solid caustic, to react with the free acetic acid and subsequently distilling the decanted liquid.

The invention will be more fully described by the following examples, although it is understood that the invention is not intended to be limited by these examples. These examples illustrate the use of N,N-dimethyl acetamide in preparing compositions of vinylidene chloride polymers. In these examples "parts" of materials is intended to mean parts by weight.

Example I

A 10% by weight solution of polyvinylidene chloride in N,N-dimethyl acetamide is prepared simply by adding 10 parts of the polymer to 90 parts of the acid-free dimethyl acetamide at room temperature and stirring the mixture until solution is completed. More concentrated solutions, for example 20–25%, are readily prepared by heating a mixture of polymer and N,N-dimethyl acetamide at temperatures higher than room temperature, including the boiling temperature of the amide at atmospheric or superatmospheric pressure. These solutions are particularly useful in the preparation of fibers, films, etc.

Example II

A copolymer of 50 parts acrylonitrile and 50 parts vinylidene chloride is insoluble in the common organic solvents and in nitromethane and only very slightly soluble in certain cyclic ketones. It is very readily soluble, however, in N,N-dimethyl acetamide which is substantially acetic acid-free. Such a composition may be used in the preparation of formed polymers which may be cold drawn or heat treated to produce molecularly oriented structures.

Example III

Ten parts N,N-dimethyl acetamide and 90 parts polyvinylidene chloride are ball milled for sufficient time to produce a homogeneous mixture.

(a) This composition is moldable per se to produce uniform dense articles by standard molding processes using heat and pressure.

(b) Solutions of vinylidene chloride polymers and copolymers are more readily prepared by dispersing such a pre-milled mixture of the polymer and N,N-dimethyl acetamide than with similar polymers not so treated. The use of pretreated polymers permits the ready dispersion of the polymers in the solvent and shortens the time required for its solution.

The composition described in paragraph (a) of Example III may be molded into cohesible structures, that is, it may be made cohesive by means of heat, pressure, or heat and pressure.

Example IV

A copolymer of 90 parts vinylidene chloride and 10 parts acrylonitrile is substantially insoluble in methyl alcohol, ethyl alcohol, acetone, methyl acetate, butylacetate, benzene, cyclohexane, dioxane, monochlorobenzene and cyclohexanone. Likewise it is also insoluble in ordinarily effective solvents such as nitromethane and nitroethane. A 10% solution of the same copolymer in N,N-dimethyl acetamide, substantially free of acetic acid, is effected by stirring at room temperature. More concentrated compositions, for example, in excess of 10% and up to 20–25% or higher, are prepared by heating the mixtures to temperatures up to and including the boiling point of the dimethyl acetamide. In some cases the solution is advantageously prepared under superatmospheric pressures. Fibers of good tenacity may be prepared from these compositions.

Example V

A copolymer of 80 parts vinylidene chloride and 20 parts acrylonitrile behaves in the same manner as the 90–10 copolymer of Example IV with regard to insolubility in the organic solvents and in a number of other highly polar solvents. However, solutions of this copolymer in substantially acetic acid-free N,N-dimethyl acetamide are prepared with no difficulty. Useful fibers may also be prepared from these compositions.

Example VI

A copolymer of 70 parts vinylidene chloride and 30 parts acrylonitrile has the same solubility characteristics as the copolymers of Examples IV and V. These N,N-dimethyl acetamide copolymer compositions may be used in the preparation of fibers having good tenacity and improved heat resistance.

Example VII

A copolymer of 85 parts vinylidene chloride and 15 parts monochlorostyrene shows similar solubility characteristics as indicated for the copolymers of the previous examples. Compositions satisfactory for the preparation of fibers, films, foils, bristles, etc., are readily prepared in substantially acetic acid-free N,N-dimethyl acetamide.

Example VIII

A copolymer of 95 parts vinylidene chloride and 5 parts alphamethylstyrene is insoluble in the solvents mentioned in Example IV. However, it is soluble in N,N-dimethyl acetamide substantially free of acetic acid. These compositions may be used in the preparation of formed polymers which may be cold drawn and heat treated to produce molecularly oriented structures particularly adapted to films, filaments and monofilms.

Example IX

A copolymer of 95 parts vinylidene chloride and 5 parts vinyl chloride is insoluble in the common organic solvents but is soluble in N,N-dimethyl acetamide substantially free of acetic acid. Such compositions may be used in the preparation of useful fibers and other molecularly oriented structures.

Similarly copolymers of vinylidene chloride and other monomers normally insoluble in the common solvents dissolve with relative ease in N,N-dimethyl acetamide, substantially acetic acid-free, for example, copolymers with acrylic and methacrylic esters, vinyl esters, allyl chloride, vinylidene bromochloride, etc.

Solutions of vinylidene chloride polymers in N,N-dimethyl acetamide are especially advantageous in spinning processes for a number of reasons. The comparatively lower viscosity of the dimethyl acetamide solutions as compared with compositions of similar concentration using certain other solvents permits easier spinning and the use of more concentrated compositions thereby reducing the amount of solvent to be removed and the resultant volume shrinkage. Moreover, the fact that the dimethyl acetamide boils at 165° C. versus 153° C. for dimethyl formamide permits higher spinning temperatures and lower recovery losses. This higher boiling point also permits higher temperatures to be used without the necessity of superatmospheric pressures, to hasten the dissolving process.

Fibers having especially advantageous properties, such as high orientation, high tenacity, high elastic recovery and low shrinkage, may be prepared from compositions of this invention by using vinylidene chloride polymers, including copolymers with acrylonitrile and other vinyl and vinylidene compounds. In these polymers, the vinylidene chloride content in the polymer molecule is preferably at least 50 percent, although in some cases polymers having not less than 80 percent vinylidene chloride are particularly advantageous.

For various purposes it may be desirable to chemically and physically modify the polymeric compositions of this invention by the presence of other materials. The N,N-dimethyl acetamide used in this invention is also useful in the preparation of mixtures of vinylidene chloride polymers with various modifying agents such as other polymers, for example, polyvinyl chloride and polyacrylonitrile, partial solvents or non-solvents, or mixtures of these, pigments, dyes, plasticizers, stabilizers, spinning agents, incrustation inhibitors, etc.

In the practice of this invention it is sometimes advantageous to polymerize vinylidene chloride in the presence or absence of other polymerizable monomers in situ while the mass is dissolved in N,N-dimethyl acetamide. In certain cases, particularly where copolymerization products are desired and especially where the copolymerizing monomers are not water soluble, the mixture may be polymerized with advantage in an emulsion system.

The vinylidene chloride polymers may be prepared by any suitable polymerization method, such as the ammonium persulfate catalyzed polymerization of monomer or monomers dissolved or emulsified in water. Molecular weights of these polymers are preferably within the range of 10,000 to 100,000, or even as high as 200,000, although polymers having molecular weights of 10,000, to 80,000 may be used with particular advantage. However, polymers of molecular weight less than 10,000 may be used for other purposes, such as impregnants, solvent-resistant coatings, etc. The molecular weight of the polymer or copolymer is dependent on the concentration of monomer or monomers, the amount and type of catalyst, temperature of reaction, etc.

As mentioned above, the compositions of this invention are especially useful in the preparation of fibers, filaments, films, etc., either by dry spinning or by wet spinning into coagulating baths of water, glycerine, acetic acid, aqueous salt solutions or other suitable liquids or mixtures of liquids.

In many cases, the formed article may be cold drawn when it is substantially free from dimethyl acetamide. In other cases a plasticizing effect may be obtained when the polymer contains small quantities, that is, 1-10% of dimethyl acetamide. With this acetamide as a plasticizer the formed polymer may be cold drawn at a lower temperature than the corresponding vinylidene chloride polymer free of plasticizer. The N,N-dimethyl acetamide plasticized polymers of this invention are particularly adapted to the preparation of molded articles or extruded forms such as rods, tubing, etc. The formed articles of this invention may be sold drawn up to 600-800% or more and thereafter heat treated in the stretched form at temperatures of 125-185°C. but preferably at temperatures of 145-155°C.

Fibers obtained in accordance with the invention can be stretched to oriented structures of high tenacity and high elastic recovery. These stretched fibers exhibit characteristic X-ray patterns showing orientation along the fiber axis. Yarns made from these fibers may be used in making stockings and, because of their heat-resistance, may also be fashioned into more general, all-purpose fabrics such as for blouses, suits, skirts, etc.

The compositions of this invention are also suitable for use in the preparation of various other shaped articles and also for use as lacquers or coating compositions. Moreover, products obtained from these compositions are free of undesirable salts, practically free of void spaces, and especially impervious to moisture and solvents.

I claim:

1. A composition of matter comprising polyvinylidene chloride dissolved in N,N-dimethyl acetamide substantially free from acetic acid.

2. A composition of matter comprising N,N-dimethyl acetamide substantially free from acetic acid and a polymer of vinylidene chloride containing in the polymer molecule more than 50 percent by weight of vinylidene chloride.

3. A composition of matter comprising a polymer of vinylidene chloride containing in the polymer molecule more than 50 percent by weight of vinylidene chloride dissolved in N,N-dimethyl acetamide substantially free from acetic acid.

4. A composition of matter comprising a polymer of vinylidene chloride dissolved in N,N-dimethyl acetamide substantially free from acetic acid, said polymer containing in the polymer molecule at least 80 percent by weight of vinylidene chloride.

5. A composition of matter comprising a copolymer of acrylonitrile and vinylidene chloride dissolved in N,N-dimethyl acetamide substantially free from acetic acid, said copolymer containing in the polymer molecule more than 50 percent by weight of vinylidene chloride.

6. A composition of matter comprising a cohesible mixture of N,N-dimethyl acetamide substantially free from acetic acid and vinylidene chloride polymer adapted for the preparation of formed articles, said polymer containing in the polymer molecule more than 50% by weight of vinylidene chloride.

7. A composition of matter as defined in claim 3 in which the polymer has a molecular weight between 10,000 and 200,000.

GAETANO F. D'ALELIO.

REFERENCES CITED

The following references are of record in the file of this patent:

UNITED STATES PATENTS

| Number | Name | Date |
|---|---|---|
| 2,325,060 | Ingersoll | July 27, 1943 |
| 2,346,208 | Conaway | Apr. 11, 1944 |
| 2,404,713 | Houtz | July 23, 1946 |
| 2,404,714 | Latham | July 23, 1946 |
| 2,404,717 | Houtz | July 23, 1946 |
| 2,405,008 | Berry et al. | July 30, 1946 |
| 2,420,565 | Rugeley et al. | May 13, 1947 |